United States Patent [19]

Takei et al.

[11] Patent Number: 5,202,798
[45] Date of Patent: Apr. 13, 1993

[54] STILL IMAGE SIGNAL RECORDING APPARATUS OPERABLE BY A MANUALLY OPERABLE MEMBER

[75] Inventors: Masahiro Takei; Koji Takahashi, both of Kanagawa; Yoshitake Nagashima, Kanagawa, all of Japan

[73] Assignee: Canon Kabushiki Kaisha, Tokyo, Japan

[21] Appl. No.: 759,843

[22] Filed: Sep. 13, 1991

Related U.S. Application Data

[63] Continuation of Ser. No. 490,498, Feb. 28, 1990, abandoned, which is a continuation of Ser. No. 34,766, Apr. 6, 1987, abandoned.

[30] Foreign Application Priority Data

Apr. 15, 1986 [JP] Japan .................................. 61-85086

[51] Int. Cl.[5] ........................................... H04N 5/782
[52] U.S. Cl. .................................. 360/35.1; 358/906; 358/909; 360/74.4
[58] Field of Search .................... 360/10.1, 10.3, 14.1, 360/14.2, 18, 19.1, 27, 31, 35.1, 60, 69, 71, 74.4; 358/343, 906, 909, 341; 250/465.1

[56] References Cited

U.S. PATENT DOCUMENTS

| | | | |
|---|---|---|---|
| 3,237,591 | 3/1966 | Pichel | 250/465.1 X |
| 4,139,869 | 2/1979 | Holt | 360/35.1 |
| 4,287,539 | 9/1981 | Bixby et al. | 360/35.1 X |
| 4,340,951 | 7/1982 | Motoyama et al. | 360/31 X |
| 4,363,051 | 12/1982 | Maeda et al. | 358/906 X |
| 4,413,288 | 11/1983 | Hurst | 360/27 X |
| 4,463,391 | 7/1984 | Takano et al. | 360/14.2 |
| 4,517,611 | 5/1985 | Kimura | 358/909 X |
| 4,544,959 | 10/1985 | Kozuki et al. | 358/906 X |
| 4,546,390 | 10/1985 | Konishi et al. | 360/35.1 X |
| 4,593,985 | 6/1986 | Minakuchi | 358/906 X |
| 4,604,668 | 8/1986 | Lemelson | 358/906 X |
| 4,620,239 | 10/1986 | Fujii | 360/27 X |
| 4,670,796 | 6/1987 | Kobayashi et al. | 360/19.1 X |
| 4,675,753 | 6/1987 | Takayama et al. | 360/27 |
| 4,689,699 | 8/1987 | Harigaya et al. | 360/74.4 |
| 4,729,051 | 3/1988 | Hutterer et al. | 360/71 X |
| 4,739,411 | 4/1988 | Bolton | 358/909 X |
| 4,746,988 | 5/1988 | Nutting et al. | 358/909 X |
| 4,758,905 | 7/1988 | Okada et al. | 360/60 X |
| 4,763,204 | 8/1988 | Kinoshita et al. | 358/909 X |
| 4,769,722 | 9/1988 | Itoh et al. | 360/19.1 X |
| 4,774,700 | 9/1988 | Satoh et al. | 360/60 X |
| 4,789,138 | 1/1989 | Terada | 360/35.1 X |

Primary Examiner—W. R. Young
Attorney, Agent, or Firm—Robin, Blecker, Daley & Driscoll

[57] ABSTRACT

An apparatus for recording, on a recording medium, still image signal corresponding to a single still image in a predetermined time. The apparatus has a function for producing a warning when an instruction for recording a next still image is given before the predetermined time elapses after the commencement of recording of the preceding still image.

20 Claims, 6 Drawing Sheets

STILL IMAGE SIGNAL RECORDING APPARATUS OPERABLE BY A MANUALLY OPERABLE MEMBER

This is a continuation application under 37 CFR 1.62 of prior application Ser. No. 490,498, filed Feb. 28, 1990 now abandoned, which is a continuation, of application Ser. No. 34,766, filed Apr. 6, 1987, now abandoned.

BACKGROUND OF THE INVENTION

1. Field of the Invention

The present invention relates to a still image signal recording apparatus and, more particularly, to a still image signal recording apparatus capable of recording an image of a high degree of fineness.

2. Description of the Prior Art

In recent years, video signal recording and reproducing apparatuses which make use of a magnetic tapes of 8 mm width, generally referred to as 8 mm VTRs, are becoming popular. Referring to the FIG. 1, a reference numeral 1 denotes a magnetic tape, 2 denotes a track in which video signals are recorded, and 3 denotes a track in which PCM audio signals are recorded. The tracks 2 and 3 are aligned in the direction of lengths thereof.

Figure 1:
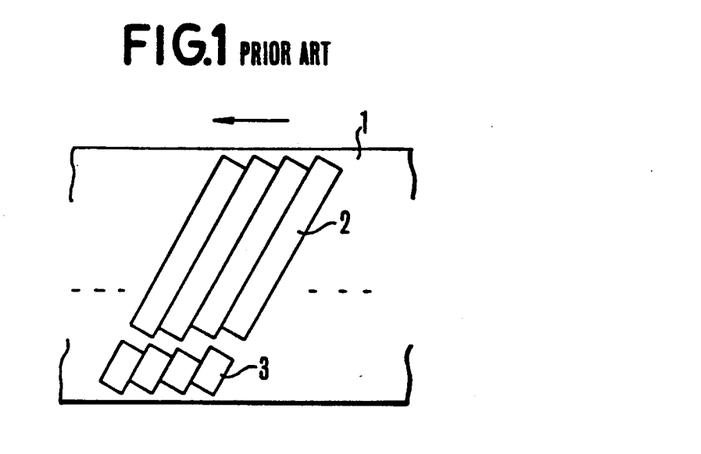
FIG. 1 is an illustration of a pattern of recording on a magnetic tape for use in a conventional VTR.

The present applicant has proposed, in the specification of U.S. patent application Ser. No. 937,872, to use the tracks 3 storing PCM audio signals also for the purpose of recording digital still image signals. Assuming that the resolution of the still image is greater than that of the moving image, it is possible to utilize the 8 mm VTR for the purpose of recording still images.

A description will be made hereinunder as to the manner in which still image data is recorded in the magnetic tape 1. In general, the record data rate of a PCM audio signal in 8 mm VTRs has to be at least 630 Kbit/sec ($2f_H \times 2 \times 10 \approx 630$Kbit/sec) on the basis of so-called user rate, where $2f_H$ represents the frequency of sampling of the audio signal.

It is assumed here that an NTSC signal, each frame of which including a luminance signal and a color difference signal, is sampled at a frequency of $4f_{sc}$ ($f_{sc}$ represents the color subcarrier frequency). In such a case, the amount of data to be carried by each frame is represented by $4f_s \times 8 \times 1/30 \approx 3.8$Mbit/frame. Therefore, the recording of a still image at the recording rate of PCM audio signal takes about 6 seconds. Several tens of seconds will be required for recording a high definition television signal (HDTV).

The recording of a still image at the recording rate of PCM audio signal requires a very large number of tracks. If the recording is started from a random position, the number of still images which are recorded incompletely will be increased.

SUMMARY OF THE INVENTION

Accordingly, an object of the present invention is to eliminate any defective recording which may be incurred by a still image recording apparatus which requires a comparatively long time for the purpose of recording still images.

Another object of the present invention is to improve the maneuverability of a still image recording apparatus which requires a comparatively long time for the purpose of recording of a still image.

To these ends, according to an aspect of the present invention, there is provided a still image signal recording apparatus comprising: recording means for recording video signals corresponding to one frame as a still image signal on a recording medium in a predetermined time; instruction means for giving an instruction for recording the still image signal by the recording means; and warning means for producing a warning when a new recording instruction for recording a new still image signal is given by the instruction means before the elapse of the predetermined time after commencement of recording of the still image signal by the recording means.

Still another object of the present invention is to provide a recording apparatus capable of recording both moving images and still images, improved such as to facilitate searching operations.

To this end, according to another aspect of the present invention, there is provided a still image signal recording apparatus comprising: still image recording means for recording video signals corresponding to one frame as a still image signal on a first region of a recording medium; moving image recording means for successively recording video signals corresponding to a multiplicity of frames on a second region of the recording medium parallel to the first region; and marking means for recording mark signals on a third region of the recording medium parallel to the first and second regions, in response to the operation of the still image recording means for recording the still image signal.

These and other objects, features and advantages of the invention will become clear from the following description of the preferred embodiments when the same is read in conjunction with the accompanying drawings.

DESCRIPTION OF THE PREFERRED EMBODIMENTS

Figure 2:
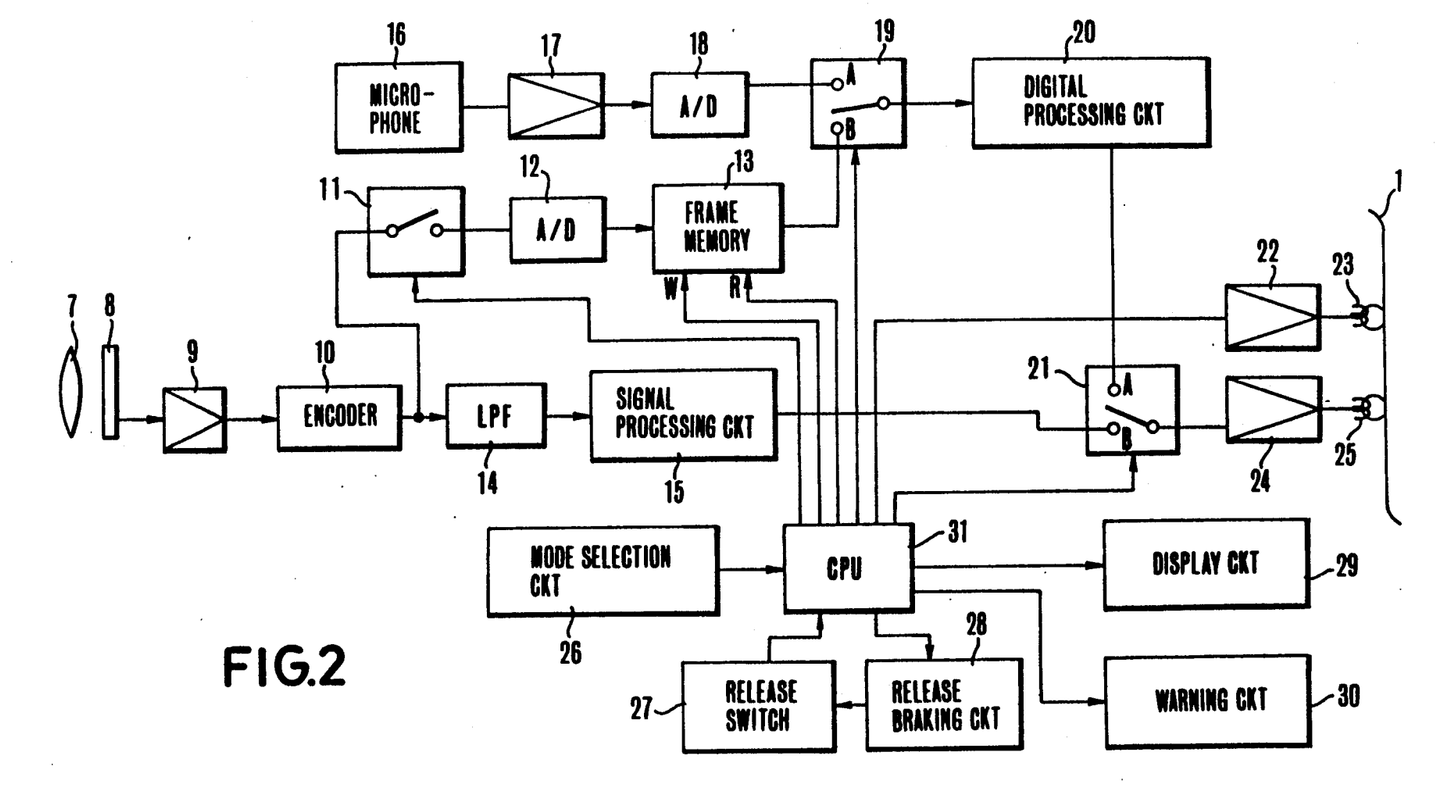
FIG. 2 shows the construction of a still image signal recording apparatus in accordance with an embodiment of the present invention.

FIG. 2 is a block diagram of a recording system incorporated in a still image recording apparatus embodying the present invention designed as an 8 mm VTR.

Figure 3:
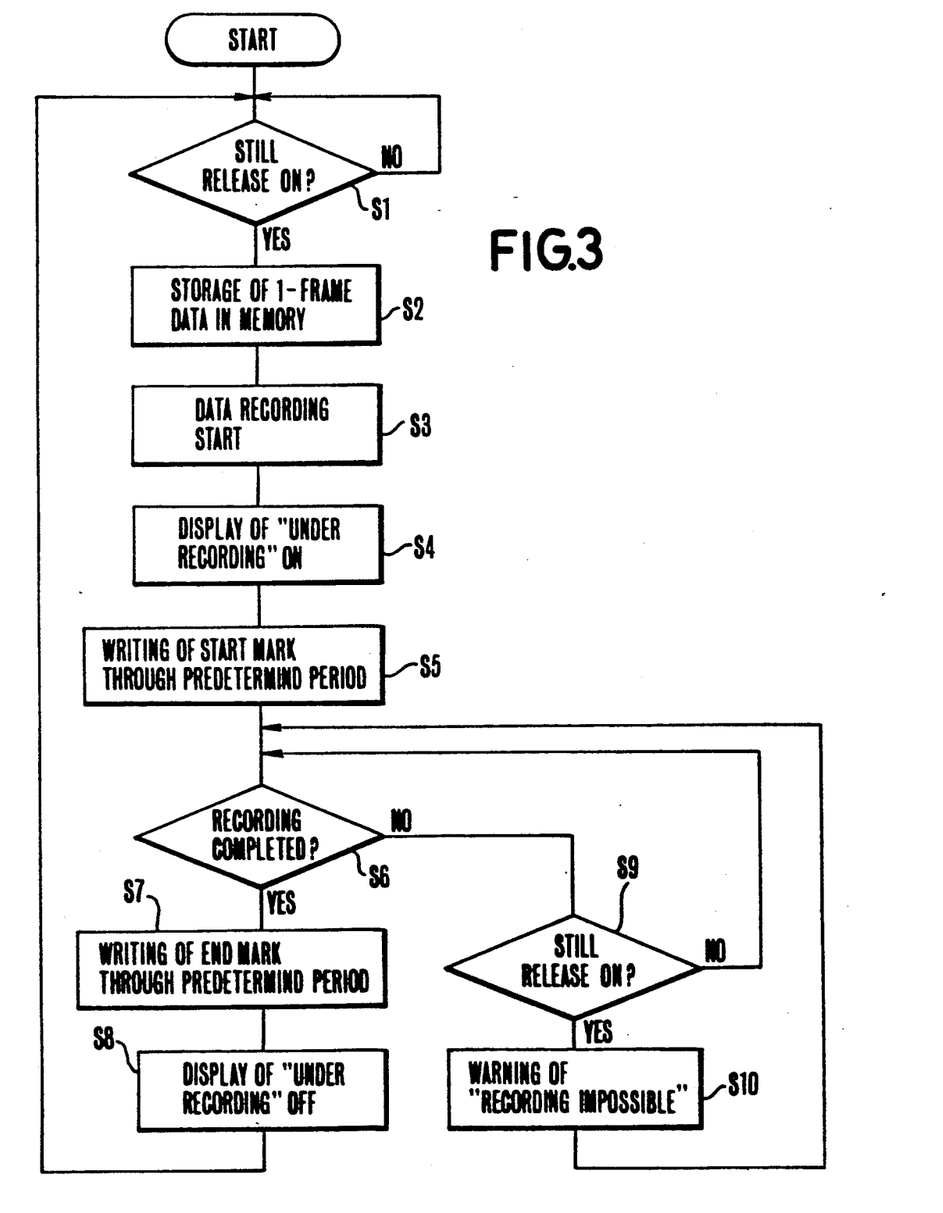
FIGS. 3 and 4 are flow charts for illustrating the operation of a CPU incorporated in the apparatus shown in FIG. 2.
Figure 4:
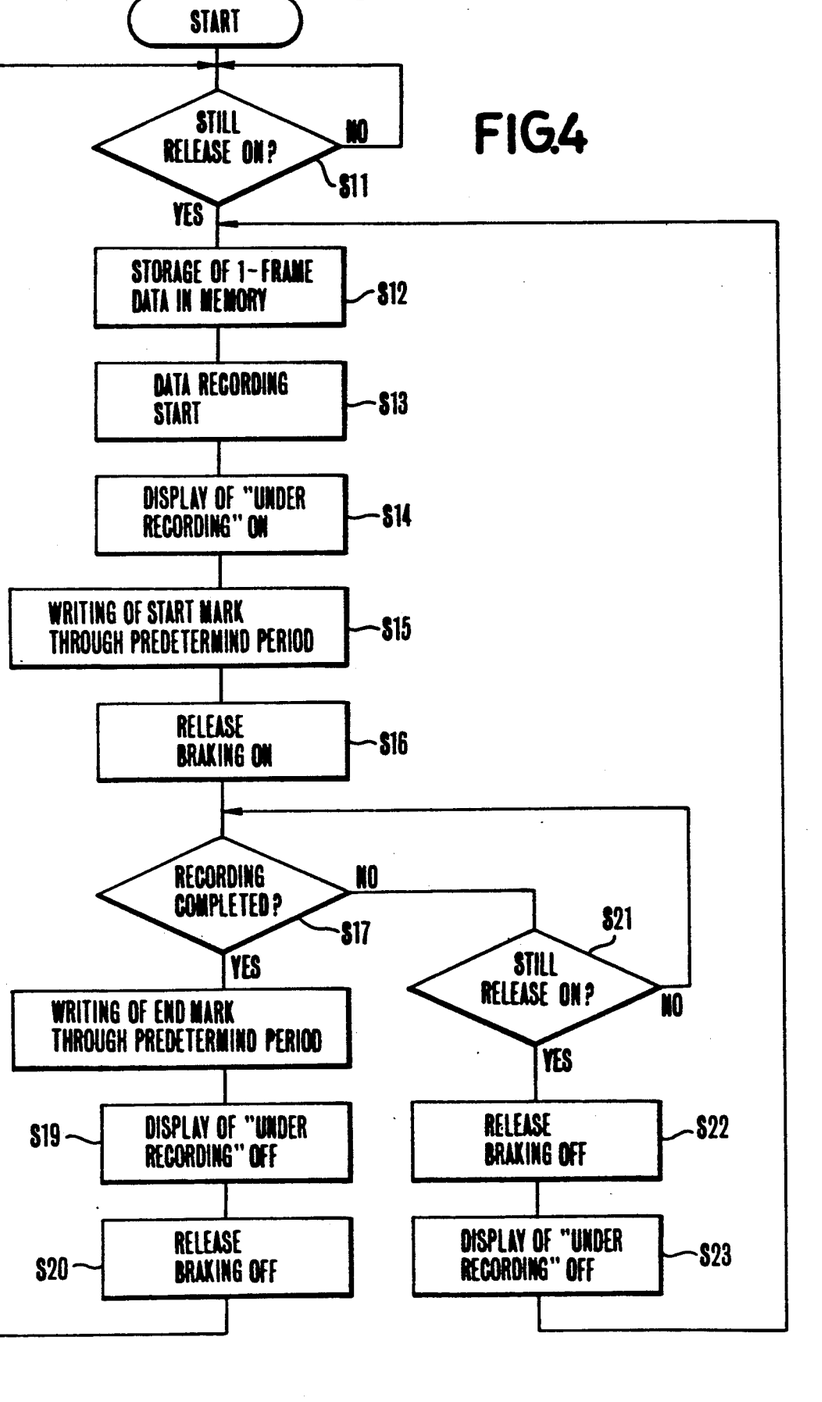

FIGS. 3 and 4 are flow charts illustrating the operation of the apparatus shown in FIG. 2. Referring to these Figures, a reference numeral 7 denotes an optical system which includes a lens, 8 denotes an image pickup element, 9, 17, 22 and 24 denote amplifiers, 10 denotes an encoder, 11, 19 and 21 denote switch circuits, 12 and 18 denote A/D (Analog-to-Digital) converters, 13 denotes a frame memory, 14 denotes a low-pass filter, 15 denotes a signal processing circuit, 23 denotes a cue head, 25 denotes a recording magnetic head, 26 denotes a mode selection circuit, 27 denotes a release switch, 28 denotes a release braking circuit, 29 denotes a display circuit, 30 denotes a warning circuit, and 31 denotes a CPU. In FIG. 2, the same reference numerals are used to denote the same parts or members as those used in FIG. 1.

The image light coming through the optical system 7 forms an image on the image pickup element 8. The output from the image pickup element 8 is input to an encoder 10 through an amplifier 9. The encoder 10 conducts a signal processing corresponding to the construction of the filter, mainly a matrix arithmetic operation, so as to transform the input signal into various desired forms of signals such as NTSC signal, R.G.B. signal, HDTV signal and so forth. The output from the encoder 10 is supplied through the LPF 14 to a system for processing moving images. The processing circuit 15 for processing the moving image is transformed to various forms of signals, and a recording analog moving image signal thus obtained is delivered to a terminal B of the switch circuit 21 so as to be recorded in the track 2 (see FIG. 2) on the magnetic tape through the head 25.

On the other hand, the output signal from the encoder circuit 10 via the switch circuit 11 is delivered to an A/D converter 12. In the A/D converter 12, sampling is conducted by sampling pulses of a predetermined frequency, so that the input signal is quantized into 8-bit signals. For instance, when the input signal is an NTSC signal, the sampling is conducted at a frequency of $4f_{sc}$ ($f_{sc}$ represents the frequency of the color subcarrier wave of the NTSC signal), whereas, when the input signal is HDTV signal, the luminance signal is sampled at 40 MHZ and the chroma-signals $C_w$ and $C_N$ are sampled at 10 MHZ, respectively. The digital signal thus obtained through the A/D converter 12 is temporarily written in the frame memory 13 in accordance with writing clocks derived from the CPU 31.

The output video signal from the encoder 10 is used both as moving image signal of a comparatively low resolution and still image signal of a comparatively high resolution. The image pickup element 8, therefore, has to satisfy the requirements for the still image signal of high resolution.

The still image signal corresponding to one frame written in the frame memory 13 is read by the reading clock from the CPU 31 at a timing which is the timing at which it is actually recorded in the recording medium. The thus read signal is delivered to one B of the input terminals of an audio-still image change-over switch circuit 19.

The audio signal is supplied to the A/D converter 18 from a microphone 16 through an amplifier 17, and the digitized output from the A/D converter 18 is delivered to the other of the input terminals of the switch circuit 19.

The switch circuit 19 is changed-over by the CPU 31 and delivers its output to the digital processing circuit 20 which includes an error correction circuit, a digital modulation circuit, and the like. The signal with redundant data added thereto by the digital processing circuit 20 is delivered to the other A of the input terminals of the switch circuit 21. The manner of digital signal processing and data arrangement are described in the aforementioned U.S. patent application Ser. No. 937,872 so that detailed description thereof is omitted. The switch circuit 21 also is changed-over by the CPU 31. When the rotary magnetic head 25 traces the track 2 (see FIG. 1) for the moving image signal of the video signal, it is switched to B, whereas, when the track 3 (see FIG. 1) for the PCM audio signal or the digital still image is traced, it is switched to A. The output signal from the switch circuit 21 is supplied to the magnetic head 25 through the recording amplifier 24 and is recorded in the magnetic tape 1. In the actual apparatus, the recording is conducted by means of a pair of rotary heads which operate at 180° phase difference from each other. In this specification, however, only one of these head is mentioned, in order to simplify the explanation. A cue head 23 for recording and reproducing a mark signal is placed above a cue track which extends along one edge of the magnetic tape 1. A start mark signal and an end mark signal which will be mentioned later are supplied from the CPU 31 to the cue head 23 through the recording amplifier 22.

The CPU 31 is adapted for receiving a digital still image recording signal from a release switch 27. The release switch 27 is controlled by the output of a release braking circuit 28 which operates under the control of the CPU 31 in accordance with a sequence which will be explained later.

A mode selection signal for selecting either a mode 1 or a mode 2 is delivered from a mode selection circuit 26 to the CPU 31. The mode 1 is a mode in which, when the recording processing of a still image picked up first has not been completed, the recording of the next still image cannot be conducted. The mode 2 is a mode in which the recording of the next still image is conducted preferentially regardless of whether the recording processing of the first still image has been completed or not. The CPU 31 then controls the recording operation either in the mode 1 or the mode 2, in accordance with the mode selection signal from the mode selection circuit 26.

The CPU 31 also delivers a control output signal to a display circuit 29 and a warning circuit 30. The display circuit 29 operates to display that the apparatus is now recording a still image, while the warning circuit 30 indicates that, when an instruction for recording the next still image is received during recording of the preceding still image in the mode 1, the instruction for recording the next still image is invalid.

A description will be made hereinunder as to the recording sequence, in accordance with FIGS. 3 and 4.

FIG. 3 is a flow chart illustrating the operation of the CPU 31 conducted when the mode 1 has been selected by the mode selection circuit 26.

The release switch 27 is turned on as an instruction for starting recording of a still image (Step S1). Then, still image data corresponding to one frame is stored in the frame memory 13 (Step S2). Then, the rate is reduced to the level of the audio signal and the data is read to commence the recording (Step S3). On the other hand, the display circuit 29 operates to display that the apparatus is now recording a still image (Step S4). Furthermore, a start mark signal 5 is written over a predetermined period through a cue head 23 (Step S5). Step S6 is a step for watching whether the recording of the whole data has been completed. In Step S9, the CPU watches whether their release switch 27 is turned on again in the period before the recording of the whole data has been completed. In the event that the switch 27 has been turned on again during this period, the CPU operates to give a warning to inform that the recording of the next still image is impossible because the processing for recording the first image is being conducted, by the operation of the warning circuit 30 (Step S10).

After the completion of the recording, the end mark mentioned before is written for a predetermined period (Step S7), and the display showing the state of under recording of moving image is ceased (Step S8), thus preparing for the next still image recording instruction given through the release switch 27.

FIG. 4 is a flow chart illustrating the operation of the CPU 31 conducted when the mode 2 has been selected by the mode selection switch 26. The operation of the CPU 31 in the mode 2 will be described with reference to FIG. 4.

As in the case of the mode 1, when the release switch for recording a still image is turned on (Step S11), the still image corresponding to one frame is stored in the frame memory 13 (Step S12), and the recording of data is commenced (Step S13). Meanwhile, a series of operations such as display of the state under recording of a still image (Step S14) and writing of a start mark (Step S14) and so forth are conducted. Then, the CPU 31 applies a certain level of braking to the release switch 27 through the release braking circuit 28 (Step S16), in order to prevent interruption of the recording of the preceding still image by recording of the next still image. The braking may be effected electromagnetically or mechanically. The extent of the braking may be such that any sign for distinguishing the present state from ordinary recording state be recognized.

If the release switch 27 is turned on again for the recording of the second still image before the completion of recording of the first still image, the release braking is dismissed (Step S22) and the display of the state under recording is stopped (Step S23). Then, the operation is commenced for picking up the still image corresponding to one frame into the frame memory.

After the completion of the recording, the end mark 6 is written for a predetermined period (Step S18) as in the case of the operation in the mode 1, and then the display of the state under recording is ceased (Step S19). Finally, the release braking is dismissed (Step S20) to prepare for the input for the recording of the next still image given through the release switch 27.

Figure 5:
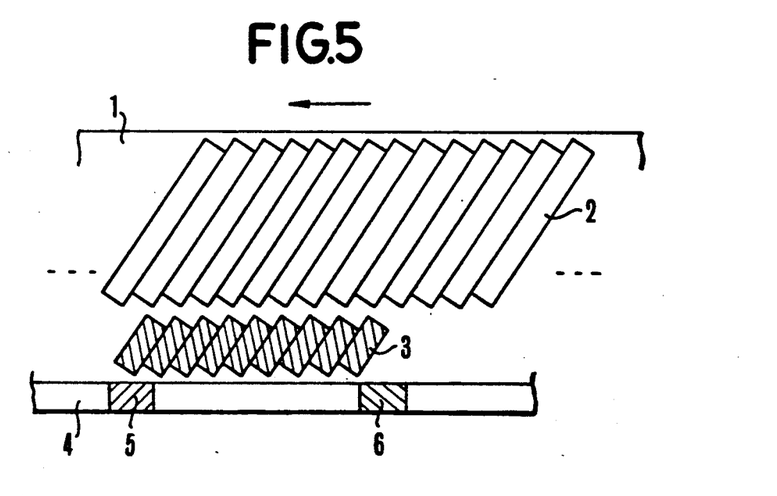
FIG. 5 is an illustration of a recording pattern on a magnetic tape used in the apparatus shown in FIG. 2.

FIG. 5 is an illustration of the form of recording in the magnetic tape 1 by the still image recording apparatus described hereinbefore. In these Figures, an arrow indicates the direction of movement of the magnetic tape 1. The tracks are successively formed from the left to the right as viewed in the figure. A linear track 4 provided on the lower end of the magnetic tape 1 is used for the purpose of recording of the mark signal mentioned before.

Referring to FIG. 5, the hatched track corresponds to a portion where a piece of still image data has been written. Discriminatable signals such as a start mark 5 and an end mark 6 are recorded in the cue track 4 so as to correspond to the points where the recording of the still image data is started and stopped. The discrimination may be made by varying the pattern of the recording, or by varying the recording frequency. Other methods are also adoptable for the purpose of discrimination.

Figure 6:
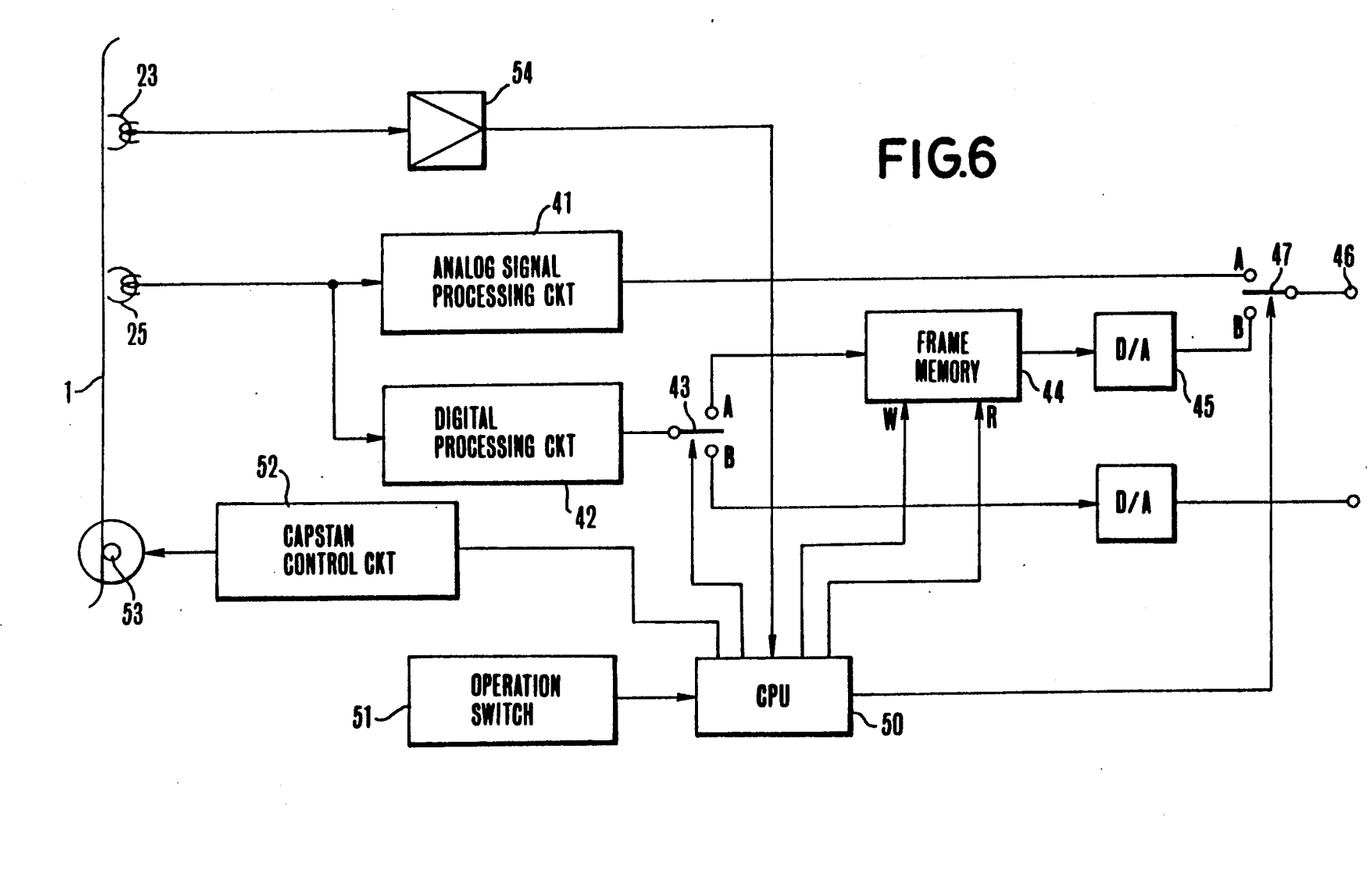
FIG. 6 is an illustration of the apparatus for reproducing the signal recorded by the apparatus shown in FIG. 2.

FIG. 6 schematically shows the construction of the apparatus for reproducing the still image signal thus recorded in the magnetic tape 1. In FIG. 6, the same reference numerals are used to denote the same parts or members as those used in FIG. 2.

The moving image signal reproduced from the track 2 of the tape 1 by the head 25 is delivered to an analog signal processing circuit 41 which is adapted for conducting a signal processing reverse to that performed by the signal processing circuit 15 shown in FIG. 2. Thus, the moving image signal is changed into the original signal form by the analog processing circuit 41 and is then supplied to the terminal A of the switch 47.

When the digital still image signal is reproduced from the track 3 of the tape 1 by means of the head 25, processings such as digital demodulation, error correction and so forth are conducted by the digital processing circuit 42, and the digital data thus processed are successively written in the frame memory 44 through the terminal A of the switch 43. When the digital still image signals corresponding to one frame have been written in accordance with the writing clock (W) output from the CPU 50, these signals are read at the original data rate in accordance with the reading clock (R) output from the CPU 50, and reproduced still image signals are derived from the D/A converter 45.

The switch 47 selects and outputs one of the moving image signal and the still image signal. The output from the switch 47 is delivered, for example, to a receiver (not shown) through a terminal 46.

A description will be made hereinunder as to the operation performed by the described reproducing apparatus for searching a still image. The description will be made with specific reference to FIG. 7 which is a flow chart illustrating the operation of the CPU 50 for searching a still image.

Figure 7:
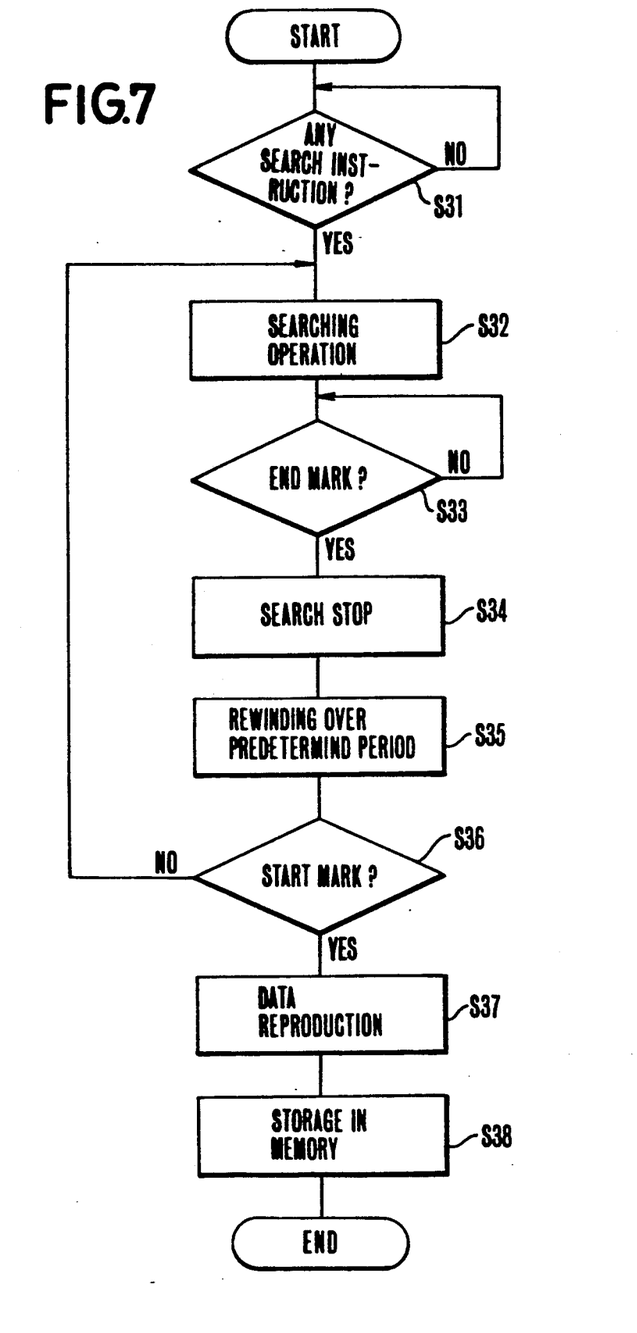
FIG. 7 is a flow chart illustrating the operation of a CPU used in FIG. 6.

As a searching instruction for searching the still image is input from an operation switch 51 (Step S31), the CPU 50 operates a control circuit 52 so as to fast feed the tape 1 by a capstan 53 (Step S32). During this fast feeding of the magnetic tape 1, the head 23 reproduces data from the cue track 4. When the signal representing the end mark 6 is reproduced by the head 23 and input to the CPU 50 through an amplifier 54 (Step S33), the searching operation is stopped (Step S34). Then, the tape is rewound for a predetermined period of time, i.e., by a length necessary for recording one still image (Step S35). If the signal representing the start mark 5 is detected after the rewinding, the CPU judges that the data has been recorded correctly (Step S36), and operates to reproduce the recorded still image data (Step S37). The thus reproduced data is temporarily stored in the frame memory 44 (Step S38), and is then read and displayed on, for example, a monitor device.

When the operation for recording still images are conducted repeatedly in mode 2, such a recording pattern is left on the tape that a plurality of start mark signals appear successively followed by an end mark signal representing the completion of recording of all the still image data. The flow explained in connection with FIG. 7 enables the still images to be reproduced without any error.

As will be understood from the foregoing description, the still image recording apparatus of the present invention has a means for giving a warning in the event that when a signal for starting the recording of a second still image signal is given during recording of the first still image signal. It is, therefore, possible to successfully record still image data of high degree of fineness, thus improving the operability of the apparatus.

What is claimed is:

1. A still image signal recording apparatus comprising:
    (a) recording means for recording video signals corresponding to one picture as a still image signal on a recording medium in a predetermined time:
    (b) a manually operable member for giving a recording instruction for recording said still image signal by said recording means;

(c) control means for controlling said recording means to continue the recording of said still image signal irrespective of whether or not a new recording instruction for recording a new still image signal is being given by said manually operable member before an elapse of a time corresponding to said predetermined time after a last recording instruction given by said manually operable member;

(d) display means for displaying, before the elapse of the time corresponding to said predetermined time after the last instruction given by said manually operable member for recording of said still image signal by said recording means, that said recording means is under operation for recording said still image signal; and (e) warning means for warning, in response to the new recording instruction given before the elapse of the time corresponding to said predetermined time after the last recording instruction, that recording the new still image signal is impossible.

2. A still image signal recording apparatus according to claim 1, wherein said recording means is operable for recording video signals corresponding to a multiplicity of frames as a moving image signal, as well as said still image signal.

3. A still image signal recording apparatus according to claim 2, wherein said recording means includes means for controlling recording placement of said still image signal and said moving image signal on different regions of said recording medium.

4. A still image signal recording apparatus according to claim 3, wherein said recording means includes means for providing prior to recording, said still image signal as a digital signal and said moving image signal as an analog signal.

5. A still image signal recording apparatus according to claim 2, further comprising image pickup means for converting an optical image into electric video signals and for outputting the thus obtained electric video signals.

6. A still image signal recording apparatus according to claim 5, wherein said recording means includes means for providing before recording, a portion of said video signals output from said image pickup means corresponding to one picture as a still image signal, and all of said video signals output from said image pickup means as a moving image signal.

7. A still image signal recording apparatus according to claim 6, wherein said recording means includes a rotary head for recording said still image signal and said moving image signal.

8. A still image signal recording apparatus comprising:

(a) recording means for recording video signals corresponding to one picture as a still image signal on a recording medium in a predetermined time;

(b) a manually operable member for giving a recording instruction for recording said still image signal by said recording means;

(c) changing means for changing the apparatus between a first mode and a second mode, in which in said first mode, said recording means continues the recording of said still image signal irrespective of whether or not a new recording instruction for recording a new still image signal is given by said manually operable member before an elapse of a time corresponding to said predetermined time after a last recording instruction given by said manually operable member, and in said second mode, said recording means starts recording of the new still image signal when the new recording instruction is given by said manually operable member before the elapse of the time corresponding to said predetermined time after the last recording instruction given by said manually operable member; and (d) first warning means for warning, in response to the new recording instruction given before the elapse of the time corresponding to said predetermined time after the last recording instruction, that recording the new still image signal is impossible, only in said first mode.

9. A still image signal recording apparatus according to claim 8, further comprising second warning means for producing a warning in response to the new recording instruction given by said manually operable member before said elapse of the time corresponding to said predetermined time after the last recording instruction given by said manually operable member, only in said second mode.

10. A still image signal recording apparatus according to claim 9, wherein said manually operable member includes a manually operable switch, and said second warning means includes resisting means for resisting the manual operation of said switch.

11. A still image signal recording apparatus according to claim 10, wherein said switch has a predetermined stroke and said resisting means includes braking means for braking the movement of said switch within said stroke.

12. A still image signal recording apparatus comprising:

(a) recording means for recording video signals corresponding to one picture as a still image signal on a recording medium in a predetermined time;

(b) a manually operable member for giving an instruction for recording said still image signal by said recording means; and (c) resisting means for resisting the manual operation of said manually operable member before an elapse of a time corresponding to said predetermined time after the instruction given by said manually operable member.

13. A still image signal recording apparatus according to claim 12, wherein said manually operable member has a predetermined stroke and said resisting means includes braking means for braking the movement of said manually operable member within said stroke.

14. A still image signal recording apparatus according to claim 12, further comprising display means for displaying, before said elapse of the time corresponding to said predetermined time after the instruction given by said manually operable member for recording of said still image signal by said recording means, that said recording means is under operation for recording said still image signal.

15. A still image signal recording apparatus according to claim 12, wherein said recording means is operable for recording video signals corresponding to a multiplicity of frames as a moving image signal, as well as said still image signal.

16. A still image signal recording apparatus according to claim 15, wherein said recording means includes means for controlling recording placement of said still image signal and said moving image signal on different regions of said recording medium.

17. A still image signal recording apparatus according to claim 16, wherein said recording means includes means for providing, prior to recording, said still image signal as a digital signal and said moving image signal as an analog signal.

18. A still image signal recording apparatus according to claim 15, further comprising image pickup means for converting an optical image into electric video signals and for outputting the thus obtained electric video signals.

19. A still image signal recording apparatus according to claim 18, wherein said recording means includes means for providing, before recording, a portion of said video signals output from said image pickup means corresponding to one picture as a still image signal, and all of said video signals output from said image pickup means as a moving image signal.

20. A still image signal recording apparatus according to claim 19, wherein said recording means includes a rotary head for recording said still image signal and said moving image signal.

* * * * *